Sept. 29, 1942.                F. SCHMIDT                2,297,506
                             ELASTIC MOUNTING
                             Filed June 9, 1941
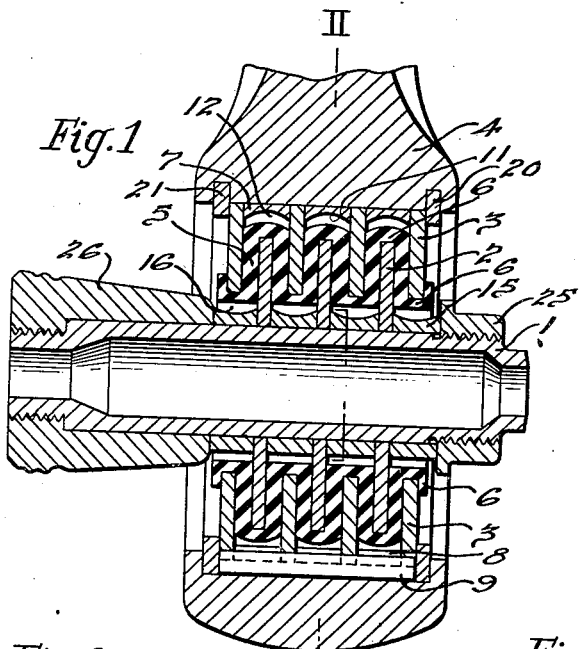
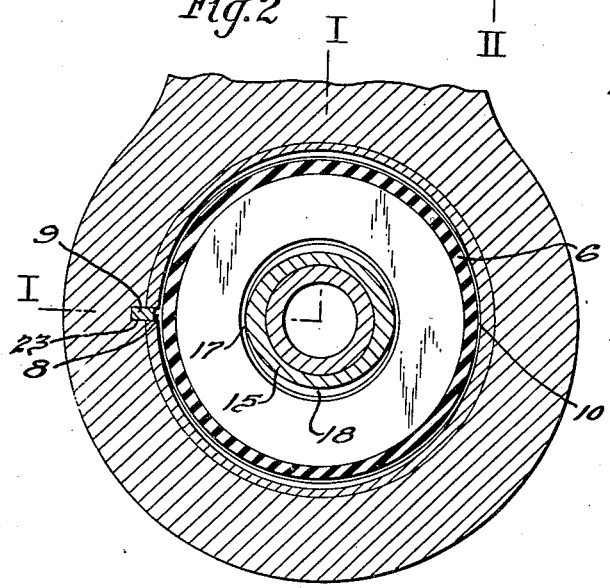
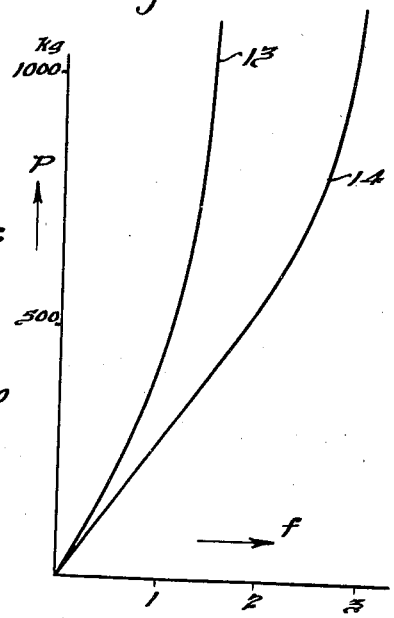
INVENTOR
Fritz Schmidt.
BY
Harness, Dickey & Pierce
ATTORNEYS Patented Sept. 29, 1942

2,297,506

UNITED STATES PATENT OFFICE 2,297,506

ELASTIC MOUNTING

Fritz Schmidt, Hamburg-Harburg, Germany; vested in the Alien Property Custodian

Application June 9, 1941, Serial No. 397,184
In Germany October 5, 1940

3 Claims. (Cl. 248—5)

The invention relates to a mounting or bearing for elastically supporting two machine elements.

Heretofore, mountings have been used where the supporting machine element and the supported machine element are each provided with a group of metal discs, which are disposed as in multiple-disc clutches and are connected to one another by rubber that is stressed in shear. One of these elements carries a group of metal discs and surrounds the attaching member of the other element, and under normal conditions of load, the flat sides of the metal discs stress the rubber in shear, but with forces acting along the axis of the bearing the flat sides of the discs stress the rubber in compression and tension respectively. Rubber surrounding the edges of the metal discs takes the severe shocks occurring in a radial direction. As used in an aeroplane engine support, the engine load is taken in a favorable elastic manner in any imaginable direction, but it has been found that in curved flight and while making so-called rolls the engine tends to shift sideways out of position, and this has up to the present time been prevented by having the supporting frame carrying the engine mounting stiffened by auxiliary struts, which necessitated an undesirable increase in weight.

An object of the present invention is to provide a mounting of this general type which has its elasticity characteristics varied in certain directions to avoid the disadvantages mentioned and thereby to avoid using a stiffening strut as employed to overcome the disadvantage.

Another object of the invention is to provide an improved elastic bearing which has elasticity characteristics radially of the bearing axis which more rapidly resist elastic movement in one radial direction than in another radial direction.

Another object of the invention is to provide an improved elastic bearing which has elastciity characteristics radially of the bearing which allow greater elastic movement in one radial direction than in another radial direction.

Other objects of the invention will become apparent from the following specification, the drawing relating thereto, and from the claims hereinafter set forth.

For a better understanding of the invention, reference may be had to the drawing wherein:

Figure 1 namely shows a side cross-sectional view of the mounting or bearing taken substantially along the line 1—1 of Fig. 2;

Fig. 2 is a cross-sectional view taken along the line 2—2 of Fig. 1;

Fig. 3 shows elasticity characteristics in radial stressing of the mounting or bearing.

According to Figs. 1 and 2, a stub shaft 1 which may be secured to an aeroplane engine for instance carries a number of metal discs 2 on its outer surface between which alternating and similar discs 3 are disposed. The latter discs are of larger inner and outer diameter and are carried on the inner surface of a journal bearing 4 which is adapted to be secured to the engine supporting frame. The space between the discs is filled with flexible rubber vulcanized thereto and it will be noted that the rubber covers the outer edges of discs 2 and the inner edges of discs 3 as indicated at 6. Rings 7, split as indicated at 8, are provided between the outer edges of discs 3 to maintain them in position and the assembled discs and rings are held in the journal opening by end split rings 20 and 21 located in grooves in the ends of the journal. Rotation of the rings in the journal opening is prevented by an axially extending key 9 located in a keyway 23 in the journal and projecting into the slot or split 8.

The rings are rectangular in cross-section at the slot 8 and at a diametrically opposite point 10. Between these two points or zones, the inner surface of each ring is formed with an arcuate groove 11 which gradually becomes deeper and wider from the zones 8 and 10 to the two intermediate and diametrically opposite points spaced 90° therefrom. In other words, each ring at the diameter defined by the slot 8 and point 10 has its inner surface flat whereas from such points to the ends of the diameter perpendicular to the first diameter, the surface is grooved with the groove gradually becoming deeper and wider. Thus, the inner surface of each ring is elliptical. A relatively large air space 12 is provided in this way between each ring and the rubber covered edge 6 of the corresponding disc 2, with the air space gradually varying in radial dimensions in accordance with the groove 11, although it is to be understood that a relatively small air space also exists even at the points 8 and 10 as is evident in Fig. 1.

The discs 2 similarly are maintained in spaced relation on the shaft 1 by rings 15 and the assembly is held in position by threaded elements 25 and 26. Rotation of the discs 2 and rings 15 relative to the shaft 1 may be prevented by a key such as mentioned before or the rings and discs may be strongly clamped by the threaded elements. Each of the rings 15 has its outer surface flat at diametrically opposite zones or points in line with the slot 8 and the surface from such points is grooved as indicated at 16 with the grooves gradually becoming deeper and wider to the points spaced 90° from the flat zones. Hence, the outer surfaces of the rings form ellipses similar to those characterizing the inner surfaces of rings 3.

From the foregoing it will be apparent that enlarged air spaces are provided along the vertical diameter in the structures as seen in Figs. 1 and 2 and it is to be understood that normally the load of the engine will be vertical. Because of this, the mounting is highly elastic in a vertical direction or direction of normal load and is well adapted to take severe shocks such as occur for example when an aeroplane lands. On the other hand, when making sharp curves in flight or in making so called aeroplane rolls, the engine is prevented from undesirably shifting sidewise by the resistance to horizontal movement of the shaft 1 relative to the journal 4. Fig. 3 illustrates in the curve 13 the more limited flexibility along the horizontal diameter of the bearing with $f$ indicating movement and $P$ load or force. Curve 14 illustrates the flexibility or shifting along the vertical diameter. In each case, of course, shifting is stopped after certain movement but even in the final movement, the rubber on the edges of the discs prevents any metal to metal contact. It may be observed too in the elasticity curves that the curve 13 rises steeply from zero whereas the curve 14 rises less steeply.

The elliptical surface on each ring may be easily made by forming or taking a ring rectangular in cross-section, clamping the ring to change its shape to elliptical and then circularly boring out the inner surface in the case of the rings 7 and outer surface in the case of the rings 15. This boring may be effected on a lathe while holding the ring elliptical. Then, when the ring is unclamped, its resiliency brings it back to circular condition and the bored or grooved surface takes the elliptical shape. As now shaped, the bored or elliptical surface comprises circular segments whose center points with equal length of radii, lie on a straight line. It will be observed too that the groove segments or inner surfaces of rings 7 between the slot 8 and point 10, form hollow spherical segments. In other words, the elliptical surface, in the zones of maximum diameter, form hollow spherical segments.

While the rings 7 and 15 are provided with elliptical surfaces as described, it may be desirable under certain circumstances to leave such surfaces circular and have the outer edges of discs 2 and the inner edges of discs 3 elliptical instead of circular. In this case, the rubber around the edges of the discs would be correspondingly elliptical. A mounting or bearing of this character would function similarly to that described and shown.

What is claimed is:

1. A mounting or bearing for elastically supporting an aircraft engine or the like comprising an outer sleeve element, an inner shaft element, apertured discs on the inner element and having their outer edges radially spaced from the wall of the sleeve element, other apertured discs disposed in alternating relation to the first discs and mounted on the wall of the sleeve and having their inner edges spaced from the shaft, and rubber between and connecting the discs, the radial spacing between the edges of the discs and the elements being different in one radial direction as compared to another radial direction so as to render the bearing more elastic in one radial direction than in another radial direction.

2. A mounting or bearing for elastically supporting an aircraft engine or the like comprising an outer sleeve element, an inner shaft element, centrally apertured discs within the sleeve and around the shaft and having their inner edges spaced from the shaft, means maintaining the outer edges of the discs in axially spaced relation on the sleeve, other centrally apertured discs on the shaft and alternating with the first discs and having their outer edges spaced from the wall of the sleeve, means maintaining the inner edges of said other discs in axially spaced relation on the shaft and rubber between the discs and bonded thereto, the parts being constructed and arranged that the annular space between the inner edge of each of the first discs and the shaft and the outer edge of each of the other discs and the sleeve is elliptical with the space zones of maximum diameter axially aligned.

3. A mounting or bearing for elastically supporting an aircraft engine or the like comprising an outer sleeve element, an inner shaft element, centrally apertured discs within the sleeve and around the shaft and having their inner edges spaced from the shaft, rings on the sleeve element between the outer edges of the discs and maintaining them axially spaced, other centrally apertured discs on the shaft in alternating relation to the first discs, rings on the shaft element between the inner edges of said other discs and maintaining them axially spaced on the shaft, rubber between the discs and bonded thereto, and means providing an annular, elliptical space radially between the rings on one element and the edges of the discs on the other element.

FRITZ SCHMIDT.